No. 630,689. Patented Aug. 8, 1899.
H. GRIES.
WHEELBARROW.
(Application filed Apr. 29, 1899.)
(No Model.)
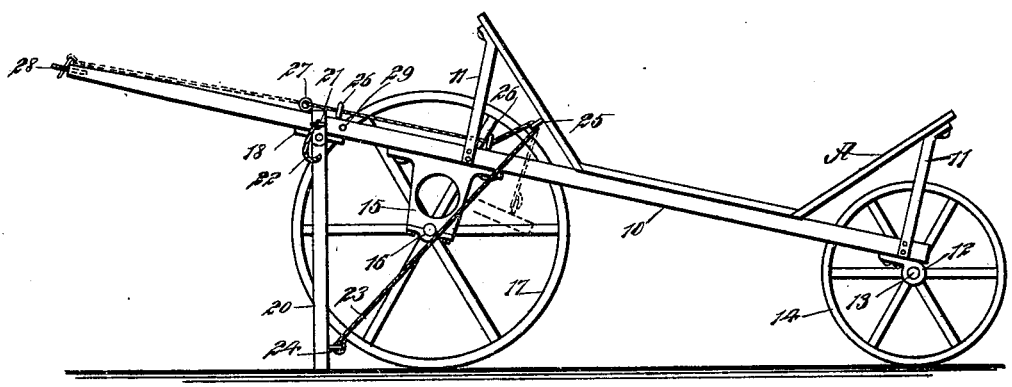
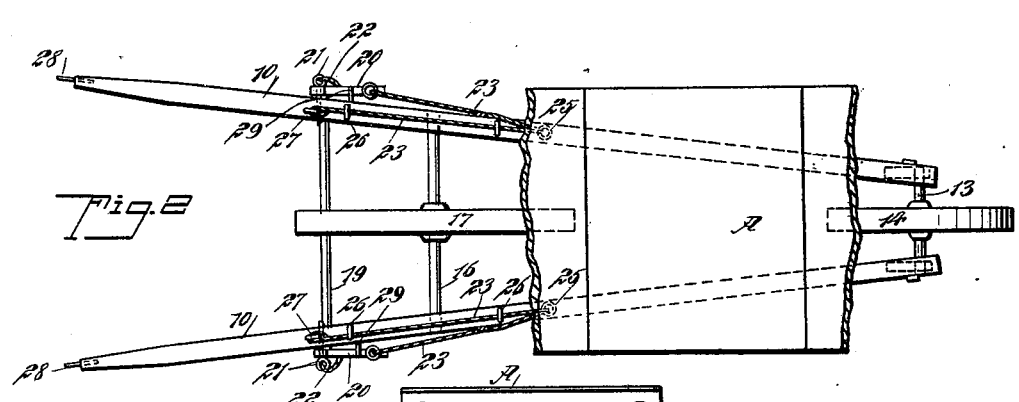
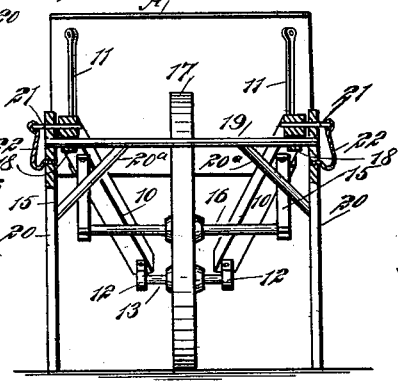
WITNESSES:
INVENTOR
Henry Gries
BY
ATTORNEYS.

UNITED STATES PATENT OFFICE.

HENRY GRIES, OF EGG HARBOR CITY, NEW JERSEY.

WHEELBARROW.

SPECIFICATION forming part of Letters Patent No. 630,689, dated August 8, 1899.

Application filed April 29, 1899. Serial No. 714,994. (No model.)

*To all whom it may concern:*

Be it known that I, HENRY GRIES, of Egg Harbor City, in the county of Atlantic and State of New Jersey, have invented a new and Improved Double Wheelbarrow, of which the following is a full, clear, and exact description.

The object of my invention is to provide the barrow with wheels arranged tandem and with pivoted supporting-legs, together with simple means for raising the legs and locking them in either an upper or a lower position.

A further object of the invention is to provide a wheelbarrow capable of use wherever an ordinary barrow can be employed, but to so construct the improved barrow that larger loads can be carried than heretofore and with less fatigue, since the operator does not support any portion of the weight, having simply to direct and propel the vehicle.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of the improved barrow. Fig. 2 is a plan view of the barrow, a portion of the body being broken away; and Fig. 3 is a vertical section through the side beams of the barrow at their handle portions.

A represents a body that may be of any desired construction and which may be utilized for carrying any desired material. This body A is supported on side or body beams 10, that converge at their forward ends and diverge at their rear or handle ends in the manner common to wheelbarrows. Braces 11 are preferably employed to connect the front and rear of the body A directly with the body-beams 10, and bearings 12 are located at the forward ends of said body-beams, in which bearings the ends of the axle 13 of the front wheel 14 of the barrow are arranged to revolve.

Brackets 15, provided with suitable boxes, are secured to the under faces of the body-beams 10 at the rear of the body A, and in the bearings of the brackets 15 the ends of the axle 16 of a rear and larger wheel 17 are mounted to turn. Other bearings 18 are secured to the under face of the body-beams 10 at the rear of the brackets or hangers 15, and in these rearward bearings 18 a shaft 19 is mounted to turn. The shaft extends beyond the sides of the body-beams 10, and at each end of the shaft a supporting-leg 20 is secured in any suitable or approved manner. When the supporting-legs 20 have one end in engagement with the ground, the opposite ends of the legs will extend upward along the outer side faces of the body-beams 10, and the legs are held in their supporting position by means of pins 21 or their equivalents, passed through the upper portions of the legs above the shaft 19 and into suitable openings made in the body-beams 10.

The pins 21 are usually attached to cords or chains 22, and said cords or chains are secured to the legs, so that the pins will be always at hand and will not be lost or mislaid. Cords or chains 23 are attached to the forward edges of the legs 20 at their lower ends, the attachment being made through the medium of eyes 24 or their equivalents, and these cords 23 are passed upward through eyes 25, located upon the rear board of the body A, and thence rearwardly along the upper surface of the body-beams 10 through guide-eyes 26, and each cord 23 is provided at its rear end with a ring 27 or other form of handle that may be brought in locking engagement with pins 28, located at the rear ends of the handle portions of the body-beams, as shown in dotted lines in Fig. 1. Stop-pins 29 are located at the outer side surfaces of the body-beams 10, just in advance of the position of the shaft 19, connected with the legs, and these pins 29 serve to prevent the barrow from moving forward when the legs are down in supporting position, the pins 21 serving to prevent the legs from yielding in a rearwardly direction.

In operation when the body of the barrow has received its load the pins 21 are withdrawn from the legs 20 and side beams of the barrow, and the upper ends of the cords or chains 23 are drawn toward the rear and attached at the rear ends of the body-beams, thus carrying the legs to the upper position out of possible contact with the surface over which the barrow is to travel, as shown in dotted lines in Fig. 1. When the barrow is brought to a position of rest, the adjusting chains or ropes 23 are disconnected from their keepers and the legs are permitted to drop until they strike the surface upon which the wheels of the barrow rest, and the pins 21 are then utilized to hold the legs stationary. It will be understood that the eyes 25 and 26 may be substituted by guide-pulleys, if so desired. The legs 20 are preferably provided with braces 20ª, that serve as an additional connection with the shaft 19, and when these braces are employed it is only necessary to employ a single rope or chain 23 for raising both legs.

It is evident that when the barrow is constructed as set forth none of the weight is supported by the operator, as is necessary in a barrow of the ordinary construction, and that all that is required of the operator is to propel the vehicle and guide it in the proper direction.

Having thus described my invention, I claim as new and desire to secure by Letters Patent—

1. A wheelbarrow, having side or body beams, wheels supporting the same, pins attached to the rear ends of the beams, legs pivotally mounted on the beams, a body carried on the beams, eyes attached to the body and to the beams, flexible connections attached to the legs and rove through the eyes, the flexible connections leading to the pins on the beams and engaging therewith to hold the legs in raised position, and means for holding the legs in the lowered or operative position.

2. A wheelbarrow, having body-beams, two wheels mounted between the same to support them, a body portion mounted on the beams and having braces extending from its end portions downwardly to the beams, the body portion being located intermediate the wheels, legs mounted on the beams, and means for securing the legs in active or inactive position.

HENRY GRIES.

Witnesses:
W. S. SCHUMACHER,
H. Y. PORTMO.